US010606668B2

(12) United States Patent
Snell et al.

(10) Patent No.: US 10,606,668 B2
(45) Date of Patent: Mar. 31, 2020

(54) DETERMINING INFORMATION RELATING TO OCCUPANCY OF A SPACE

(71) Applicant: InfraRed Integrated Systems Limited, Northampton (GB)

(72) Inventors: William Snell, Milton Keynes (GB); Stuart Holliday, Northampton (GB)

(73) Assignee: InfraRed Integrated Systems Limited, Northampton (GB)

(*) Notice: Subject to any disclaimer, the term of this patent is extended or adjusted under 35 U.S.C. 154(b) by 574 days.

(21) Appl. No.: 13/891,136

(22) Filed: May 9, 2013

(65) Prior Publication Data

US 2013/0305261 A1 Nov. 14, 2013

(30) Foreign Application Priority Data

May 10, 2012 (GB) .................................. 1208228.5

(51) Int. Cl.
| | | |
|---|---|---|
| *G06Q 10/02* | (2012.01) | |
| *G06F 9/54* | (2006.01) | |
| *G06Q 10/04* | (2012.01) | |
| *G06Q 20/20* | (2012.01) | |

(52) U.S. Cl.
CPC ............. *G06F 9/542* (2013.01); *G06Q 10/02* (2013.01); *G06Q 10/04* (2013.01); *G06Q 20/202* (2013.01)

(58) Field of Classification Search
CPC .. G06Q 30/02; G06Q 10/047; G06Q 30/0264; G06Q 10/063; G06Q 10/06316
USPC ........................................................ 705/7.11
See application file for complete search history.

(56) References Cited

U.S. PATENT DOCUMENTS

| | | | | | |
|---|---|---|---|---|---|
| 4,700,295 | A | * | 10/1987 | Katsof | .................. G06Q 10/06 235/379 |
| 6,023,681 | A | * | 2/2000 | Whitt | ..................... G06Q 10/06 705/7.29 |
| 8,861,710 | B2 | * | 10/2014 | Nimmagadda | ..... H04M 3/5238 379/265.01 |
| 2003/0220835 | A1 | * | 11/2003 | Barnes, Jr. | ......... G06Q 10/1053 705/14.36 |

(Continued)

FOREIGN PATENT DOCUMENTS

EP 0853237 A1 7/1998

OTHER PUBLICATIONS

Little's Law (Service Engineering—Last Revision Apr. 2007—NPL—pp. 1-23).*

(Continued)

*Primary Examiner* — Johnna R Loftis
*Assistant Examiner* — Matthew D Henry
(74) *Attorney, Agent, or Firm* — Fredrikson & Byron P.A.

(57) ABSTRACT

A method of determining information relating to the occupancy of a space that includes receiving first data relating to the occupancy of the space over a time period, receiving second data indicative of either times of decrementing events or times of incrementing events affecting the occupancy of the space during the time period, and either, for each decrementing event time, using the first data to obtain an estimated incrementing event time, or, for each incrementing event time, using the first data to obtain an estimated decrementing event time. The method has particular application in the determination of waiting times, for example in the context of queue monitoring.

21 Claims, 12 Drawing Sheets

(56) References Cited

U.S. PATENT DOCUMENTS

| | | | | |
|---|---|---|---|---|
| 2006/0250278 A1* | 11/2006 | Tillotson | ......... | G08G 1/14 |
| | | | | 340/932.2 |
| 2007/0211879 A1* | 9/2007 | Shaffer | ......... | H04M 3/4938 |
| | | | | 379/265.01 |
| 2007/0250355 A1* | 10/2007 | Leet | ......... | G06Q 10/02 |
| | | | | 705/5 |
| 2007/0253595 A1* | 11/2007 | Sorensen | ......... | G01C 9/00 |
| | | | | 382/103 |
| 2008/0303662 A1* | 12/2008 | Sorensen | ......... | G06Q 30/02 |
| | | | | 340/541 |
| 2011/0224899 A1* | 9/2011 | Mathews | ......... | G01C 21/3685 |
| | | | | 701/533 |
| 2011/0244887 A1* | 10/2011 | Dupray | ......... | G01C 21/206 |
| | | | | 455/456.2 |
| 2011/0320256 A1* | 12/2011 | Florucci | ......... | G07B 15/02 |
| | | | | 705/14.33 |
| 2012/0281094 A1* | 11/2012 | Forshaw | ......... | G01C 11/00 |
| | | | | 348/150 |
| 2013/0282420 A1* | 10/2013 | Paul | ......... | G06Q 10/06 |
| | | | | 705/7.16 |

OTHER PUBLICATIONS

Little's Law (Service Engineering, NPL, pp. 1-23, Last revision Apr. 2017).*

* cited by examiner

DETERMINING INFORMATION RELATING TO OCCUPANCY OF A SPACE

This application claims priority to GB Application No. 1208225.8, filed May 10, 2012, which is herein incorporated by reference.

BACKGROUND

The following relates to a method and system for determining information relating to the occupancy of a space by one or more objects. The method and system have been devised for determination of queue lengths and other kinds of waiting times. However the method and system have other applications such as the determination of a number of vehicles in a car park or parking lot and the determination of the occupancy of other spaces by objects other than people.

The information determined using the method and system may be any information that is useful in determining occupancy including time of arrival of objects into the space and time of departure.

Some information relating to queue length can be obtained from a camera viewing a queuing area. For example, a camera or other optical sensor may be used to view people queuing at a supermarket checkout. Image data from the camera or other sensor can be processed to provide an estimate of the queue length. However there are many sources of possible error in estimates obtained from image or other sensing data alone.

For example, using image data, it is not always possible to resolve groups of people standing close together to determine the number of individuals. Furthermore, a number of individuals is frequently not indicative of queue length, for example when two individuals shop together. Therefore, for an accurate determination of queue length, it is preferable in certain embodiments to define "shopping units" each of which may comprise more than one individual. A shopping unit may comprise a family group for example.

The same potential inaccuracies arise when using image data to determine occupancy of other kinds of space by people or objects. The potential for inaccuracies is particularly significant if the information to be determined is not simply the number of objects or individuals, but rather a number related to groups of individuals such as shopping units.

SUMMARY

Certain embodiments provide a method of determining information relating to the occupancy of a space, the method comprising:
  receiving first data relating to the occupancy of the space over a time period;
  receiving second data indicative of either times of decrementing events or times of incrementing events affecting the occupancy of the space during the time period; and either:
    for each decrementing event time, using the first data to obtain an estimated incrementing event time or
    for each incrementing event time, using the first data to obtain an estimated decrementing event time.
The method may comprise using the second data and either the obtained estimated incrementing event times or the obtained estimated decrementing event times to obtain revised data relating to the occupancy of the space over the time period.

If it assumed that the second set of data is correct, it can be used together with the estimated event times to obtain improved estimates of the numbers of objects in the space over the time period.

The first data may comprise estimated numbers of objects or object groups in the space and the method may comprise using corresponding decrementing and incrementing event times to determine a duration of occupancy of the space by an object or object group.

The first data may comprise estimated numbers of objects or object groups in the space which include non-integer values for the number of objects or object groups in the space.

The use of the estimated numbers to obtain estimated incrementing or decrementing event times may comprise finding an estimated event time for each of the event times in the second data for which an error value $$\sum_{t=0}^{T} |ot - qt|$$

is minimized, where ot is the number of objects or groups of objects in the space at time t obtained from the first data and qt is the number of objects or object groups in the space at time t determined using one or more event times from the second data and a possible estimated event time.

The minimum error value may be determined by calculating a change in error resulting from different possible estimated event times. This can save on processing and memory space in the determination of the minimum error value.

In some implementations it may be assumed that a step change of a predetermined amount occurs at each event. The predetermined amount may be an integer such as one.

The finding of an estimated event time may be carried out only for values of t in a time window within the time period. For certain implementations this enables the provision of information relating to the occupancy in real-time (allowing for the duration of the window) rather than, for example, waiting for the end of the day to perform the calculations.

The second data may comprise data indicative of times of decrementing events affecting the occupancy of the space during the time period and the step of using the first data to obtain an estimated incrementing event time may comprise performing a search for incrementing event times over a time window preceding the decrementing event time.

The second data may comprise data indicative of times of decrementing events of objects or object groups from the space during the time period.

Certain embodiments of the invention include a method of determining the length of a queue to use a facility comprising determining incrementing event times corresponding to increase in queue length using a method as described above.

For example, each decrementing event time may be taken to indicate a decrease in the queue length.

If the second data comprises data indicative of times of incrementing events affecting the occupancy of the space during the time period, the step of using the first data to obtain an estimated decrementing event time may comprise performing a search for possible decrementing event times over at least a time window following the incrementing event time.

The performance of the search for possible decrementing event times corresponding to a particular incrementing event time may comprise:

a) estimating a decrementing event time for each incrementing event time in the time window following the particular incrementing event time; and b) using any estimated decrementing event times in step a) to determine a possible decrementing event time corresponding to the particular incrementing event time.

In step a) a decrementing event time may be estimated for each incrementing event time in the time window taking the incrementing event times in reverse chronological order.

In an alternative method, the second data may be data indicative of times of decrementing events of objects or object groups from the space during the time period.

There is then provided a method of determining fulfillment duration comprising determining decrementing event times corresponding to fulfillment using a method as described above and taking each decrementing event time as the end of a fulfillment time.

Each incrementing event time may be taken to be the start of a fulfillment duration.

The first data may be obtained from sensing apparatus positioned to monitor the space.

The second data may be obtained from electronic transaction apparatus.

Certain embodiments of the invention include a computer readable medium comprising instructions which when implemented in one or more processors of computing apparatus cause the apparatus to perform any of the methods described above.

Certain embodiments of the invention include computing apparatus comprising one or more processors configured to implement any of the methods described above.

Certain embodiments of the invention include a system for determining information relating to occupancy of a space comprising:
one or more sensors and associated signal processing circuitry configured to process signals from the one or more sensors to output data comprising estimated numbers of objects or object groups in the space over a time period; and
computing apparatus as described above.

The system may comprise electronic transaction apparatus from which the second data is obtained.

The first and second data may comprise sets of data. It should be noted that these "sets" of data may not be sets in the strict mathematical sense and may include identical times for different incrementing events and decrementing events. This is because for practical purposes a time period is divided into blocks and each event occurs in a time block, so that it is possible for multiple events to take place in the same block and be noted as taking place at the same time. Furthermore it may be possible in some implementations for multiple events to take place at the same time.

The second data is preferably independent of the first data in certain embodiments. In other words it has been derived in a completely independent manner.

The first data may relate to numbers of objects or groups of objects in the space. The objects or groups of objects may be a subset of objects present in the space.

The details of one or more examples are set forth in the accompanying drawings and the description below. Other features, objects, and advantages will be apparent from the description and drawings, and from the claims.

DETAILED DESCRIPTION

Figure 1:
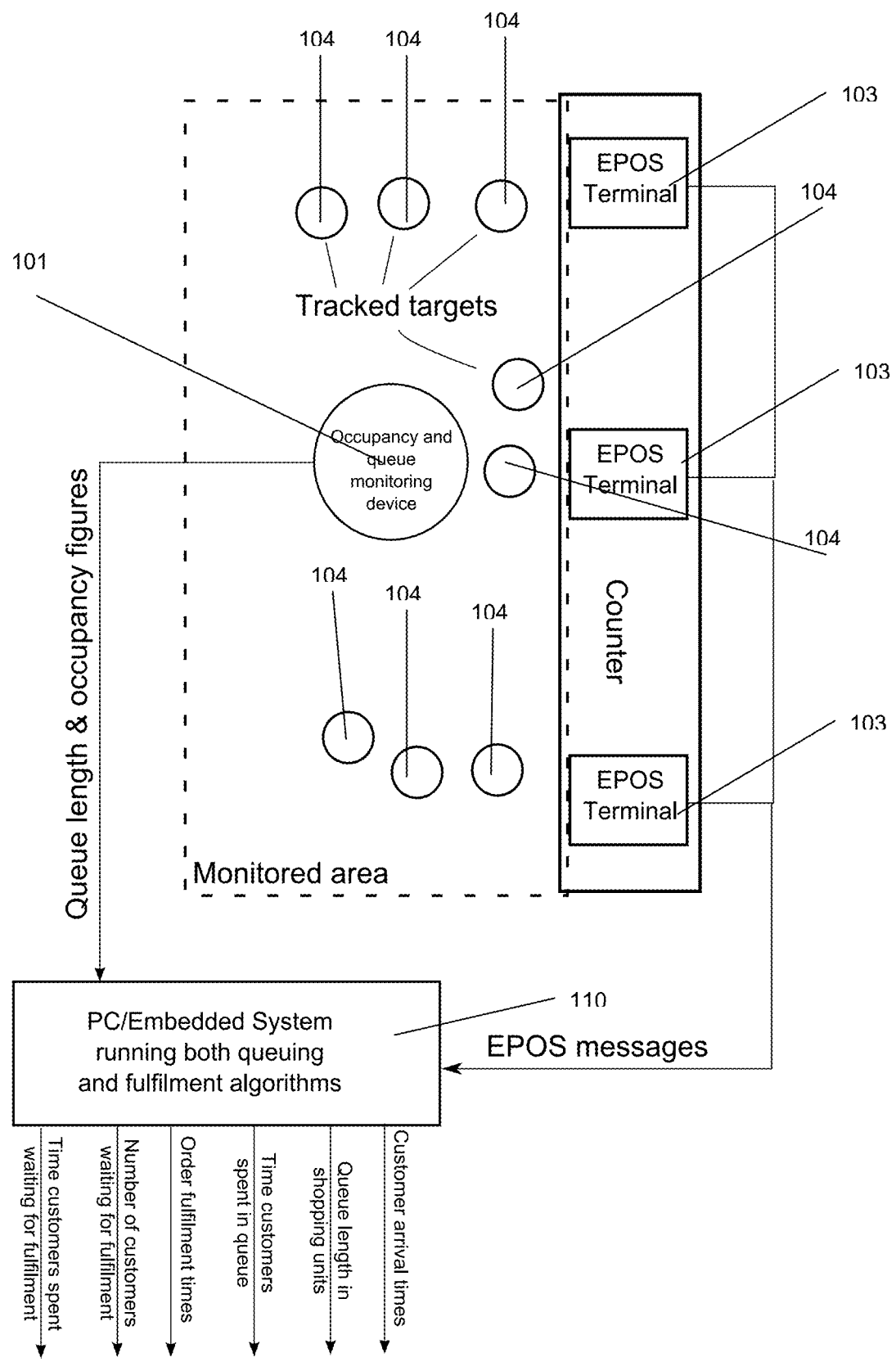
FIG. 1 shows schematically an example implementation of a system for determining information relating to the occupancy of a space.

The following describes methods and systems in which estimated numbers of objects in the space are augmented with additional data relating to either departure times of objects from the space or entry of objects into the space. It is assumed that this additional data is correct and this is used to obtain more accurate information relating to the occupancy of the space. For example, if the additional data comprises departure times, this can be used together with the estimated occupancy numbers to determine estimated arrival times. Conversely, if the additional data comprises arrival times, this can be used together with the estimated occupancy numbers to determine estimated departure times.

In the example embodiments to be described below, data is used comprising either arrival times or departure times or both. For the purpose of the determinations, arrivals and departures are treated as events and are therefore described as "arrival events" or "departure events" or collectively as "events". However it will be appreciated that the method and system may have other applications and the methods and systems to be described below are equally applicable to kinds of incrementing and decrementing events. Examples of such events that may not always be referred to as "arrival" and "departure" include items being dropped into or fed out of a container.

In the following, objects that might occupy the space being monitored include people, animals and vehicles. This is not an exhaustive list of the kinds of objects to which the method and system may be applied. The method and system may have application to situations where the objects are not self-propelled such as articles being moved on a production line.

It should be noted also that the data relating to the occupancy of the space over a time period may relate to a subset of objects observed in the space or to groups of objects in the space (with the possibility that a group may comprise only one object).

In the following, two specific methods and corresponding systems are described as example implementations of the method and system described above. The two methods are used for determining event timings, such as the determination of departure event times from arrival event times or the determination of arrival event times from departure event times. Arrival events and departure events may be correlated and this may be used to determine the length of time between arrival and departure for objects. From this it is possible to determine a variety of information relating to the occupancy of a space such as the average duration of occupancy by objects.

The methods and systems have numerous applications as has been noted above. For example they may be used in the determination of customer wait times in various situations.

In the first embodiment to be described below, departure event times are used together with estimated occupancy numbers to obtain estimated arrival event times. The estimated occupancy numbers may be based on some observed heuristic value, such as may be obtained from image or sensing data. The estimated arrival event times may be used together with the departure times to obtain an improved estimate of the number of objects in the space. This is particularly useful for determining the length of a queue to use a facility, such as a supermarket checkout, ticket queue, car park exit barrier and more. Data may be obtained from the facility relating to the time of its usage. Each usage may be taken to be a departure event. For example, in the case of a supermarket checkout, data such as point of sale (POS) data may be obtained relating to the completion of a transaction and this may be treated as a departure event for a shopping unit. The timing of each departure event, together with estimated numbers of objects in the space, can be used to determine estimated arrival event times. The estimated arrival and departure event times may then be used to obtain improved estimates of numbers of objects in the space, or queue length. This in turn may be used to determine average length of time spent queuing.

In the second embodiment to be described below, arrival event times are used together with estimated occupancy numbers to obtain estimated departure event times. As with the first example, the estimated occupancy numbers may be based on some observed heuristic value, such as may be obtained from image or sensing data. The arrival event times are used together with the estimated departure event times to obtain an improved estimate of the number of objects in the space. This is particularly useful in the determination of order fulfillment time, for example where something has been paid for and customers then have to wait for delivery or other fulfillment of the order. Consider for example a situation in which customers pay for items or service or otherwise and are then directed to a waiting area for their order to be fulfilled. In this situation data such as point of sale data may be obtained and this may be treated as indicative of an arrival event. This, together with estimated numbers of objects in the space, can be used to determine estimated departure event times. The arrival event times and estimated departure event times may then be used to obtain improved occupancy figures and this in turn can be used to determine average wait time.

Another example where estimated departure event times might be calculated from arrival event times is in pre-paid car parks. The two event times may then be used to calculate improved occupancy figures and this can be used to determine average time spent in a car park by a vehicle.

It should be noted here that the terms "electronic transaction apparatus" and "POS apparatus" are not only used in connection with actual sales. For example such apparatus is used for the dispensing of cinema tickets (which may have been paid for already), parking tickets (which may be paid for on leaving the car park), cash dispensing and other transactions in which a sale does not itself take place at the apparatus itself. Such apparatus is nevertheless generally referred to as POS apparatus in this field and the terms "electronic transaction apparatus" and "POS apparatus" are used interchangeably below and are not limited to apparatus at which a sale is transacted.

FIG. 1 shows schematically an example implementation of a system for determining information relating to the occupancy of a space. The system shown in FIG. 1 comprises a sensor 101 providing heuristic occupancy and/or queue monitoring information relating to an area 102 indicated by the dotted line. Sensors of this kind are known in the art and will not be described in detail herein. One suitable sensor is described in EP0853237.

The sensor 101 comprises a detector array and suitable signal processing circuitry for processing signals from the detectors. Using the signals from the detectors, the signal processing circuitry is able to identify and track targets 104.

The system further comprises multiple EPOS terminals 103. However a system could comprise a single EPOS terminal 103. Thus one or more EPOS terminals output data indicative of an arrival or departure event, depending on the system implementation.

In the illustrated system of FIG. 1, the EPOS terminals 103 are arranged along a counter 107 as might be the case in a fast food outlet. The signal processing circuitry within sensor 101 may be able to discriminate between targets 104 that have visited the point of sales terminals 103 and those that have not. Thus, the sensor 101 would be able to output information relating to the number of targets (persons or individuals) that are waiting after having visited the EPOS terminals, assumed to be waiting for order fulfillment. In this way the signal processing circuitry identifies a subset of the total number of objects in the space monitored by the sensor.

In an alternative implementation the EPOS terminals might be at a supermarket checkout and targets in the monitored area 102 might be queuing to use the terminals. In this situation the sensor 101 is able to output information in a manner known in the art relating to numbers of targets queuing at each terminal. It will be appreciated that multiple sensors could be used in place of the single sensor 101. For example it might be appropriate to use one sensor for each EPOS terminal, especially for queue monitoring.

Sensor 101 is one example of a system capable of outputting heuristic occupancy and/or queue monitoring information and any other system capable of providing similar information may be used.

In the context of determining waiting times, counting individual objects may not be sufficient to obtain accurate information. This is because people often shop or perform other transactions in groups, sometimes referred to as "shopping units". An example of a "shopping unit" in the context of a retail outlet is a group of people sharing one transaction, for example a family group shopping together.

The sensor or other source of data may simply output estimated numbers of objects in the space. Alternatively, depending on the nature of the sensor and the manner in which sensed signals are processed, the sensor may output estimated numbers of "shopping units" which do not necessarily correspond to numbers of objects. A "shopping unit" is an example of a group of objects. It should be noted that a group may contain only one member and therefore an individual may be classed as a shopping unit.

Another possible complication in the context of monitoring waiting times is the presence of objects in the space that need to be excluded, such as loiterers who are not shopping or performing transactions at all. It might be desirable to exclude these completely. This may or may not be done by the sensor or other source of occupancy data. Therefore the heuristic information used in processes described herein may be based on a subset of objects in the space.

It will be clear from the foregoing that the use of data from EPOS terminals to augment sensor or other heuristic information is able to verify or improve estimated occupancy numbers obtained using sensor data. This is particularly the case where the occupancy numbers of interest relate to shopping units, or more generally groups of objects, rather than individual objects, or to a subset of the individual objects.

It should be mentioned also that the sensor itself may comprise the necessary processing capability to determine numbers of objects or shopping units from sensed signals. Alternatively this processing may be done at a remote location from the sensor itself.

The system further comprises computing apparatus, generally indicated by box 110. The computing apparatus 110 receives input data from the sensor 101 and the EPOS terminals 103 and is configured to process the data in a manner to be explained in more detail below.

It will be appreciated that the EPOS terminals may output a large amount of data that is not relevant to the occupation of the space or monitored area 102, such as details of items purchased. In a simple implementation, the system simply requires an indication that a transaction is complete and the time at which this occurs can be treated as equivalent to a departure event (for example in the case of monitoring queues to perform the transaction) or an arrival event (for example in the case of monitoring times taken to fulfill a transaction). The relevant information from the EPOS data may be extracted at the computing apparatus 110. However it is more likely that only selected information for the purpose of monitoring the occupancy of the space is provided from the terminals 103 to the apparatus 110.

The exact information obtained from the EPOS terminals and the manner in which it is used to indicate an event will depend on the terminals and the nature of any transactions they are performing. For example, a checkout at a retail outlet may display a "next customer please" message and the generation of this message may be taken to be indicative of the end of a transaction. Thus, for example, when information displayed to a customer changes to "next customer please" this may be used to generate an EPOS end message indicating the time at which the displayed information changed.

More generally, it is usually possible to determine from POS information whether the POS equipment is:
  Closed (for normal trading)
  Open (for normal trading)
  In transaction
  Out of transaction It may be necessary for the computing apparatus 110 to interpret or convert information obtained from the EPOS terminals for use in the processes to be described below. This might be a simple case of format conversion. Alternatively if the POS information indicates transaction start times but not transaction end times, it might be necessary for end times to be estimated.

EPOS data may be supplied to computing apparatus 110 directly from the point of sale terminals 103. In a practical system EPOS data output from terminals 103 will usually be sent to a location remote from the terminals 103 such as a server serving all of the terminals. If that is the case the EPOS data may be provided to the computing apparatus 110 from the server or some other intermediate device between the EPOS terminals 103 and the computing apparatus 110.

Alternatively the computing apparatus 110 may comprise or be integrated with other computing apparatus such as a server performing other operations on the EPOS data.

The computing apparatus 110 and/or other computing apparatus may be remote from the store or other building in which the EPOS terminals and may be configured to analyze EPOS data from terminals at locations remote from each other—e.g. in separate retail outlets.

The computing apparatus 110 may be configured to perform one or both of queuing and fulfillment determination, depending on the requirements of a particular set up. The computing apparatus may comprise a personal computer or other suitable embedded system configured to run suitable algorithms to perform operations on the EPOS data and the heuristic information to be described below.

Thus, output information from the system 110 may comprise one or more of:
  Customer arrival times
  Queue length in shopping units
  Time spent by customers in queue
  Order fulfillment times
  Number of customers waiting for fulfillment
  Time customers spent waiting for fulfillment
  Total waiting time in a predetermined time window
  Total fulfillment time in a predetermined time window.

The foregoing are examples of the kinds of information that may be output. It is not an exhaustive list.

Figure 2:
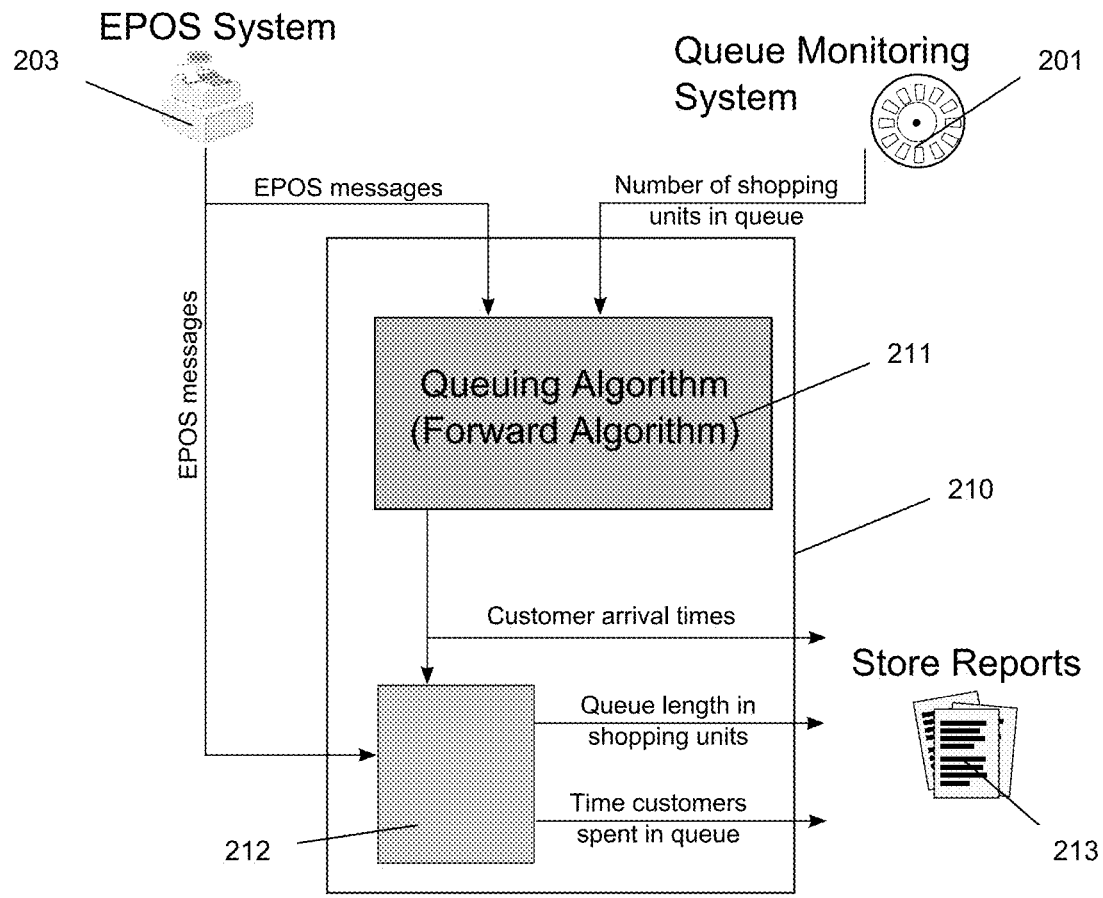
FIG. 2 shows in schematic form a specific set-up of apparatus for determining queue length.

FIG. 2 shows in schematic form a specific set-up for determining queue length. This comprises a sensor 201 or other device configured to provide heuristic occupancy and/or queue monitoring information. The setup of FIG. 2 further comprises an EPOS terminal 203 and computing system 210 configured to perform calculations to be described below. The operation on the EPOS and heuristic data can be considered to comprise two stages, namely determination of arrival event times from departure event times using the heuristic data indicated by box 211 and converting the arrival and departure event times into other information such as queue lengths and customer waiting times indicated by box 212 which can be used to compile store reports 213.

Generation of Arrival Event Times from Departure Event Times.

The generation of arrival event times from departure event times, such as might be used to determine the length of a queue for a supermarket checkout or other transaction apparatus, generates a set of arrival event times, given a set of departure event times and some observed heuristic value. The observed heuristic value may be an estimate of queue length obtained from image or sensing data and may be in the form of numerical values determined at discrete time intervals or blocks. For reasons that will become clear, it is assumed that the departure event times are correct and that the observed heuristic value contains errors. It is assumed that at each arrival or departure event there will be a step change of equal amount, upward or downward, in the value of which the observed heuristic value is an estimate. However this change in observation may be attenuated or intensified by noise. Thus, to take a simple queuing example, actual values of queue length will increase or decrease by one at each arrival or departure whereas the observed heuristic value may vary by some other amount. The method to be described below can also accommodate arrivals and departures within the same time interval where the values of queue length may increase or decrease by more than one.

If the system is modified to deal with multiple arrivals and departures in the same time block, as mentioned below, the step change may be a multiple of some constant amount.

In a queuing implementation as shown in FIG. 2, the system 210 is provided with departure event end times and a (noisy) observation of the current number of shopping units in the queue. For example, the departure event times may be obtained from electronic POS data and the observation of the current number of shopping units might be provided from image or sensing data. Customer arrival event times are then generated at stage 211 such that the queue lengths determined by the sequence of customer arrivals and departures (EPOS ends) best match the observed values.

Once this set of most likely arrival times has been obtained it is then possible to obtain estimates of total and average customer queuing times that are more accurate than those obtained from the heuristic values alone. One way to achieve this is to plot a graph of the most likely queue lengths for the day and hence obtain an accurate estimation of total customer queuing time (as the area under this graph). One way to achieve this is as follows:

Given a set of EPOS departure event times $\varepsilon \subseteq \{0, \ldots, T\}$ and a sequence of queue length observations $obs_0, \ldots, obs_T$ a set of estimated arrival times $\mathcal{A} \subseteq \{0, \ldots, T\}$ may be found such that $$\sum_{t=0}^{T} |obs_t - qlen_t|$$

is minimized, where
$qlen_t$ is an estimate of queue length obtained using the estimated arrival event time and the given EPOS departure event time and the following assumptions are applied:

$$|qlen_t = qlen_{t-1} + \begin{cases} 1, & \text{if } t \text{ in } \mathcal{A} \\ 0, & \text{otherwise} \end{cases} - \begin{cases} 1, & \text{if } t \text{ in } E \\ 0, & \text{otherwise} \end{cases}$$

$qlen_0=0$. (this final assumption not essential—see below).

That is, the queue length at time t, $qlen_t$, is the queue length at time t−1 add any arrivals in time block t, minus any departures (EPOS ends) in time block t.

Note that this can be extended to where $\mathcal{A}$ and $\varepsilon$ are multisets to allow the case where we have two or more arrivals (or departures) in the same time block. The mathematical process would then obtain qlen_t from $qlen_{t-1}$ by adding and subtracting the multiplicities of t within $\mathcal{A}$ and $\varepsilon$ respectively.

By the nature of the use of discrete time it is assumed that all times are instantaneous. So whilst a time block actually relates to a section of the continuous real-world time, as far as the system is concerned these are just instantaneous times. That is all events and observations occur at instantaneous times—enumerated as time blocks.

Here is an example using a time block size of 5 seconds. For time blocks starting at 10 am.

| Time Block Number | Start of block | End of block |
| --- | --- | --- |
| 0 | 10:00:00 | 10:00:04 |
| 1 | 10:00:05 | 10:00:09 |
| 2 | 10:00:10 | 10:00:14 |

When time stamps are received they are converted to time block numbers to add them to $\mathcal{A}$ or $\varepsilon$. So if there were three EPOS end events at 10:00:02, 10:00:03 and 10:00:04 three zeros would simply be added to $\varepsilon$.)

It is not a requirement that $qlen_0=0$. It is possible to start with any initial queue length. For example if a queue monitoring system was turned on while a queue was already present, the system would set the next received departure event times and the corresponding estimated arrival event times to 0.

In its simplest form the process for finding estimated arrival times may take the form a rather intuitive retrospective search for arrival event times performed at the end of the day, however with some alterations the process can provide the generated events in real-time with a time lag based on the size of a search window.

The foregoing assumes that the queue length is incremented by one at each arrival event and decremented by one at each departure event. There may be applications of the method and system where this is not the case. However it would usually be the case that the size of the increase or decrease would always be the same in which case the amount can be converted to 1 or a suitable convenient figure to simplify the calculations.

As an example application where the value may be non-integer consider measuring occupancy via some weighing system (assuming a constant weight for each subject/object). Then the expected change would be this average weight.

For correctness, certain embodiments iterate over the EPOS ends in chronological order—from first to last.

Simple Arrival Search

---

Given a set of EPOS ends times $\varepsilon$ and observations $obs_0, \ldots, obs_T$.
findArrivals($\varepsilon$, $obs_0, \ldots, obs_T$)
{
  Start with arrival set $\mathcal{A}$ empty.
  for (each EPOS end time e in $\varepsilon$)
  {
    for($\alpha = 0, \ldots, e$ )
    {
      Calculate error as $\Sigma_{t=0}^{e} |obs_t - qlen_t|$, where the
      $qlen_i$ have been generated using $\varepsilon$ and $\mathcal{A} \cup \{a\}$.
    }
    Add arrival time which gave least error
    (greatest reduction in error) to $\mathcal{A}$.
  }
}

---

The search window can be limited by imposing a maximum limit for the time duration between an arrival event and a departure event, i.e. maximum queuing time. If we assume customers can be in the queue a maximum of w time blocks, then we can limit the search window to w time blocks back from the EPOS end time. This has a negligible effect on correctness given that events are not longer than wtime blocks.

It will be seen that when determining the arrival time for a customer the process only depends on the previous observations and arrivals/departures. Moreover, when imposing a limit on the search window, the process only depends on the previous events within the search window. This means that it is not necessary to wait until the end of the day to run the process; the computation is distributed throughout the day. This means the process is suitable for systems with limited processing power and results can be produced in real time with a time lag equal to the size of the search window.

It should also be noted that it is not necessary to calculate $\Sigma_{t=0}^{e}|obs_t-qlen_t|$ for successive values of t. All that is needed is to calculate the change in error between placing the arrival n blocks ago and placing the arrival n−1 blocks ago.

Note that the change in error from placing the arrival n blocks ago is the sum of the change in error over block n and the change in error from placing the arrival in block n−1 (since if the customer arrived n blocks ago, he/she was still there n−1 blocks ago, n−2 blocks ago, . . . and 1 block ago since the customer leaves on his/her EPOS end (which is now). This allows the calculation of changes in error to be optimised. An error buffer the size of the search window may be stored, which maintains queue lengths (given from arrival and EPOS end times) minus the observed. The buffer is updated as observations are added by pushing values to the front of the buffer and adding 1 to the appropriate blocks when adding arrival events.

Including these modifications the process becomes the following:

EPOS End Callback

Given an EPOS end time e and error buffer values $err_{e-w+1}, \ldots, err_e$ giving the current error over the last w time blocks.

```
onEPOSend(e, err_{e-(w-1)}, ... , err_e)
{
  changeInError = 0
  bestIndex = 0
  for(i = 0, ... , w − 1)
  {
    changeInError = changeInError − |err_{e-i}|;
    changeInError = changeInError + |err_{e-i} + 1|;
    if(changeInError is less than best found so far)
    {
      bestIndex = i
    }
  }
  Add arrival time e − bestIndex.
  Keep error buffer values to up to date by
  adding 1 to each of err_e, ... , err_{e-bestIndex}.
}
```

Figure 3A:
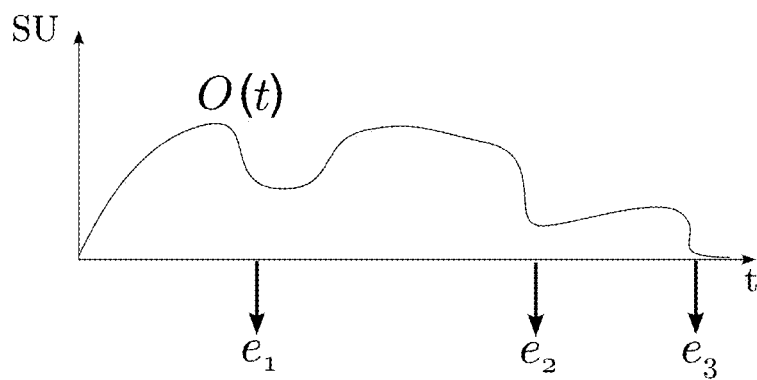
FIGS. 3a to 3i are graphs showing iterations in a process of determining arrival event times from departure event times.

A brief example of operation of the two processes described above for obtaining estimated arrival times will now be explained with reference to FIGS. 3a to 3i. As noted above the input data to computing apparatus 210 of FIG. 2 comprises EPOS end times $e_1$, $e_2$, $e_3$ and observations of queue length O(t). For simplicity of illustration it is assumed that the discrete time intervals are sufficiently small to consider time as continuous. The inputs to the system can then be represented graphically as shown in FIG. 3a.

Figure 3B:
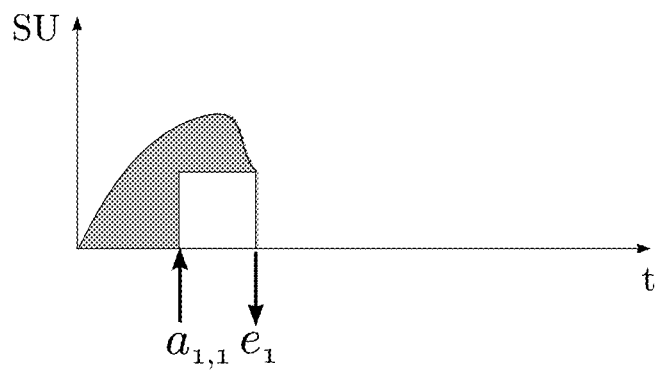
Figure 3C:
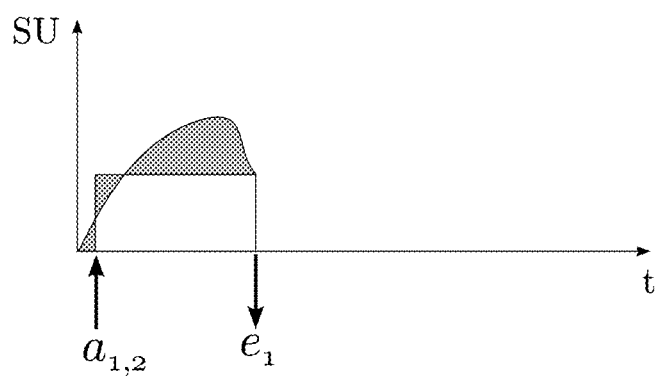
Figure 3D:
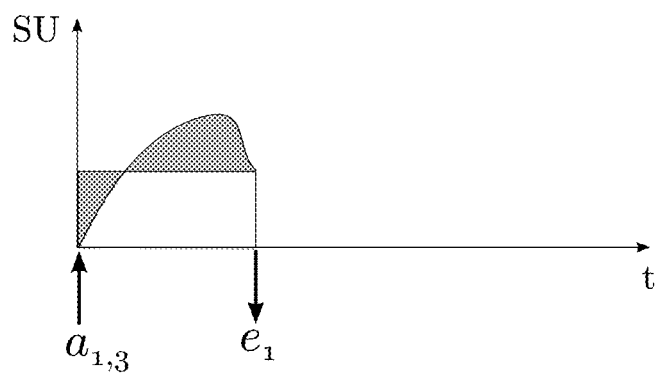

Given the first EPOS end $e_1$ a search is then made for the best place to put an arrival. Three candidates are shown in FIGS. 3b, 3c and 3d respectively namely $a_{1,1}$, $a_{1,2}$ and $a_{1,3}$. The curve is a section of the observation curve of FIG. 3a and the step function (in this case a simple rectangle) is the queue length as derived from the EPOS end and arrival times. The error is represented by the grey shaded region in each of FIGS. 3b, 3c and 3d.

It can be seen that $a_{1,2}$ results in the lowest error and hence $a_{1,2}$ is the arrival time that is retained.

Figure 3E:
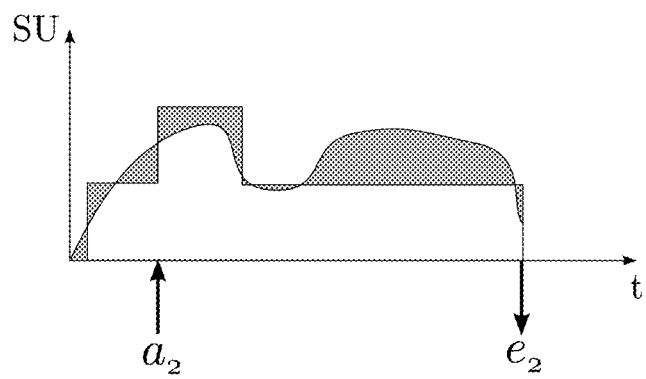

For the next EPOS end $e_2$ the algorithm would give $a_2$ as shown in FIG. 3e since this minimizes the shaded error region.

Figure 3F:
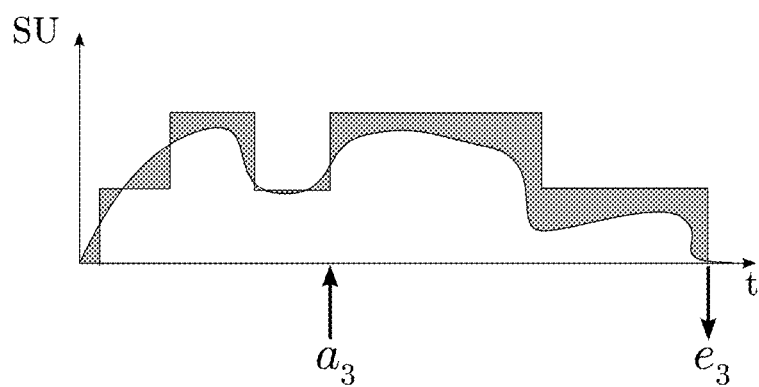

For our final EPOS end, $e_3$ we would obtain the arrival $a_3$. This is shown in FIG. 3f.

Figure 3G:
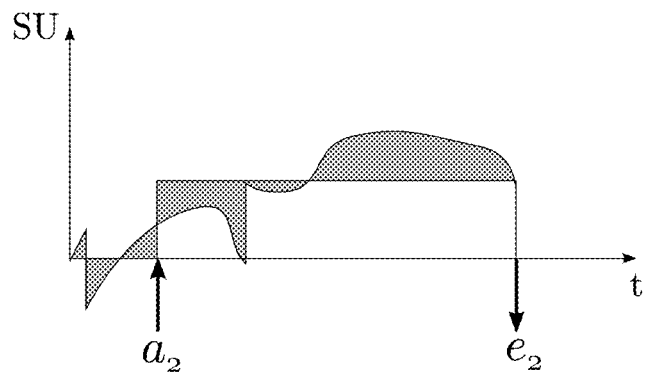
Figure 3H:
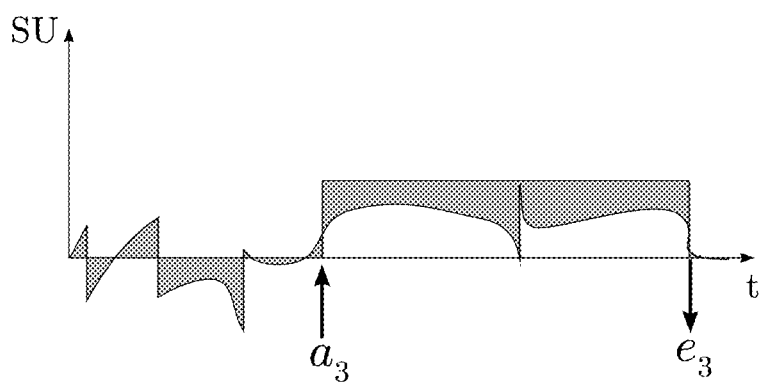

When using the error buffer optimisation technique mentioned above, the search for $a_1$ is identical, however the searches for $a_2$ and $a_3$ differ slightly. Once an arrival has been found, the queue component caused by this shopping unit is subtracted from the observation, and hence the error is always measured against the, as yet, unaccounted for observation. This is shown in the search for $a_2$ in FIG. 3g. A comparison of FIGS. 3e and 3g shows that the observed values between $a_1$ and $e_1$ represented by the graph are reduced. Similarly the error buffer optimisation technique for $a_3$ is shown in FIG. 3h.

Figure 3I:
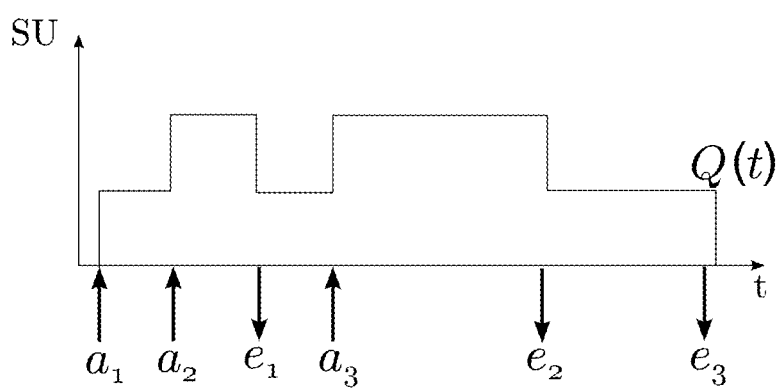

The outputs of the process are the arrival times $a_1$, $a_2$, $a_3$, which together with the given EPOS end times generate a much improved estimation of queue length as shown in FIG. 3i. This also results in a more accurate approximation to customer queue time (as area under the graph).

It will be appreciated that the graphical representations of FIGS. 3a to 3i are for the purpose of illustration only and it is not necessary for the results to be presented visually in this way.

By the nature of a queue, customers depart in the same order as they arrive. Hence given a set of ordered arrival events and ordered departure (EPOS end) events they can be matched up to obtain queue times for each customer as follows.

Enumerate the elements, in numerical order, in ε and $\mathcal{A}$ as $e_1, \ldots e_n$ and $a_1, \ldots a_n$ respectively. Recall that there the same number of elements in ε and $\mathcal{A}$ by nature of the algorithm. Customer queuing durations $c_1, \ldots c_n$ are obtained as $$c_i = e_i - a_i.$$

Given the amount of time each customer spent in the queue and the instant in time when the customer's transaction occurred, various statistics (averages, standard deviation, etc) can be calculated for the day or any part thereof. For example, calculate the average time spent in the queue by customers whose transactions occurred between 4 pm and 5 pm.

The queue length for any time can be obtained by tallying up the arrival and departures up to that time as in the calculation of $qlen_i$ above.

Figure 4:
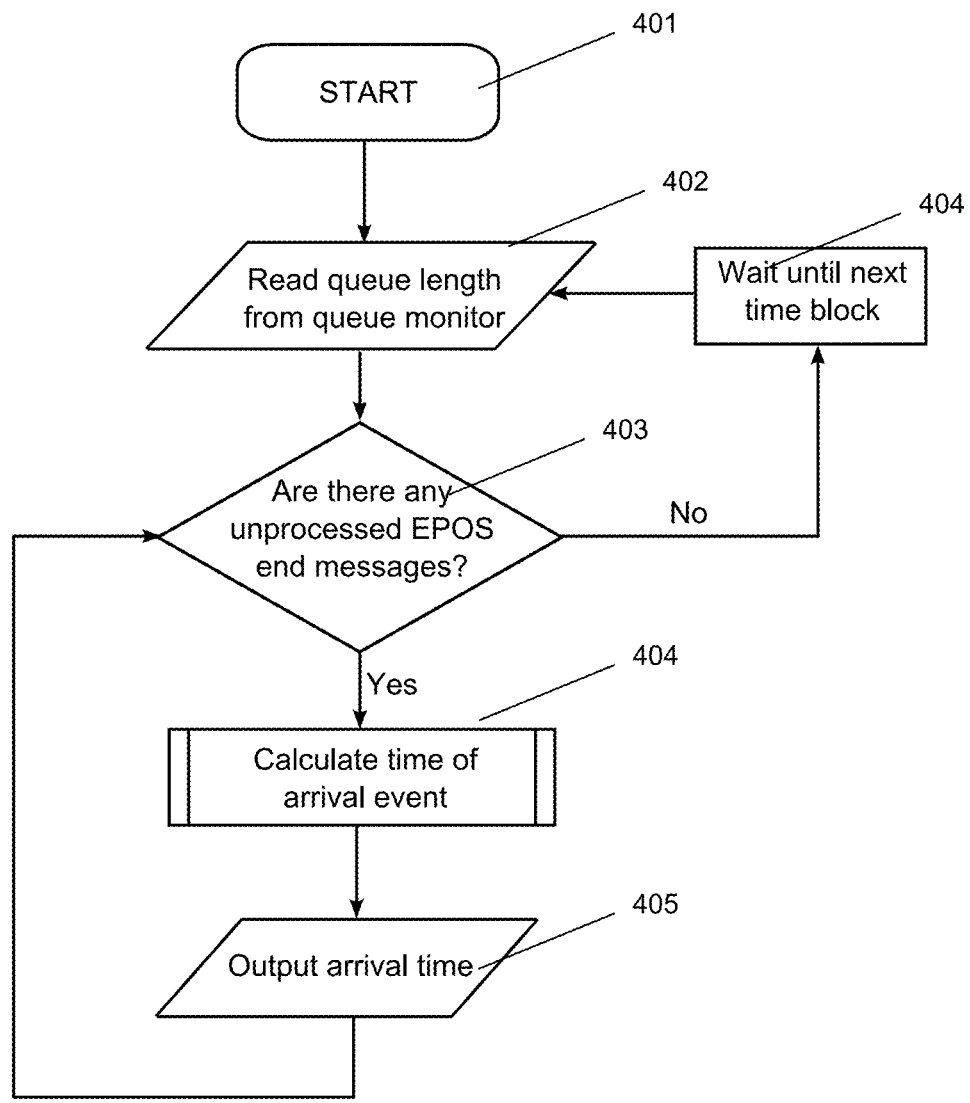
FIG. 4 is a flow chart showing steps in a process of determining arrival event times from departure event times.

FIG. 4 is a flow chart providing a broad overview of the steps of a method of determining arrival event times from departure event times. The process begins at step 401 with initialisation. Then at step 402, queue length is read from a queue monitor such as the sensor described above or any other apparatus providing an estimation of queue length. With successive iterations of the process of FIG. 4 data will be accumulated indicating variations in queue length over a time window. Step 402 may be repeated until a sufficient data set has been accumulated before the process continues to step 403.

At step 403 a decision is made as to whether there are any unprocessed EPOS end messages. By "unprocessed" is meant EPOS end messages (assumed to be equivalent to departure events) for which no arrival event times have been calculated. If no, step 402 is repeated after a time block has elapsed at step 404. If yes, an arrival event time is determined at step 405 according to a subroutine to be described with reference to FIG. 5. The arrival time is then outputted at step 406.

Figure 5:
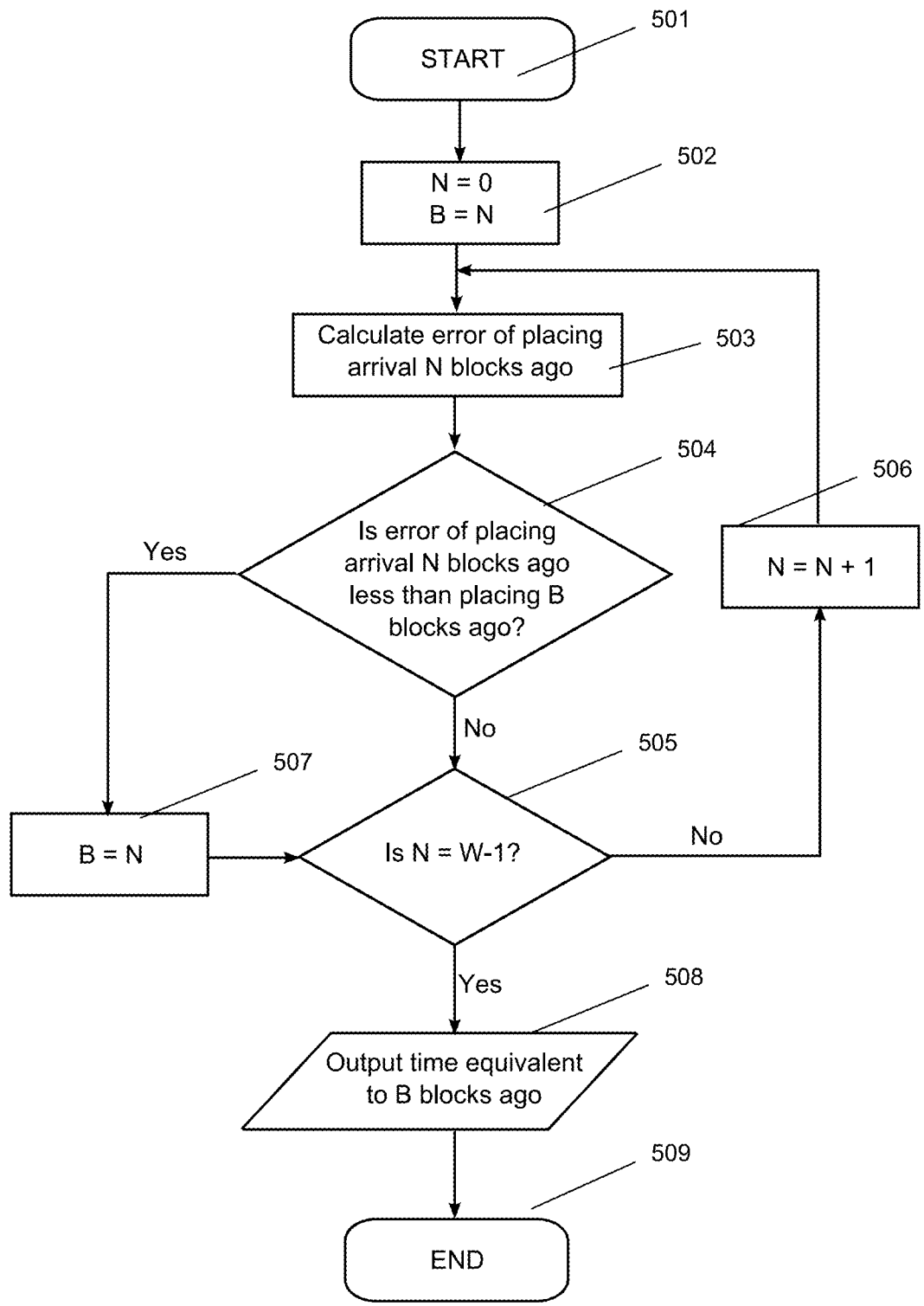
FIG. 5 is a flow chart showing steps in a subroutine of the process illustrated in FIG. 4.

The error calculation subroutine is shown in FIG. 5. The process begins with initialisation at step 501. At step 502 value N is set to zero and value B is set to be equal to N, i.e. also zero. At step 503, the unprocessed EPOS end message is used together with the queue length data obtained in step 402 (FIG. 4) to perform an error calculation based on placing the arrival equivalent to the unprocessed EPOS end message N blocks ago.

At step 504 a decision is made as to whether the error of placing the arrival N blocks ago is less than the error of placing the arrival B blocks ago. It will be appreciated that in the first iteration N=B and therefore the decision will be negative. The process then proceeds to step 505 where a decision is made as to whether N=W−1, where W is the number of time blocks in the window under consideration. Again in the first iteration the answer will be negative and therefore the process continues to step 506 where N is incremented by 1.

Step 503 is now repeated and at this point N will be one greater than B so that a comparison of two different error calculations is made at step 504. If at this iteration the result of the decision at step 504 is positive, B is made equal to N. Step 505 is then repeated. This is to check that all possible W arrival event times within the time window are considered and the one resulting in the least error is selected. Thus if the decision at step 505 is negative, the comparison of error calculations at step 504 is repeated and if the error calculation is improved, B is updated at step 507. The process ends when the decision at step 505 is positive. The time equivalent to B blocks before the EPOS departure event time is then output as the corresponding arrival event time, at step 508. The process ends at step 509, to be repeated when further unprocessed EPOS end messages become available at step 403.

It should be noted that there is no reason the above method could not be used where the time between the updates from the sensor or other occupancy monitoring system are greater than each time block. E.g. 1 second time blocks may be used with the queue length updates coming in every 4 seconds. Then the observation values $obs_0, \ldots, obs_T$ used in further calculations would be interpolated from the actual values provided by the sensor or other occupancy system. Whilst the notion of 'time blocks' would suggest a simple piece-wise interpolation, there is certainly no reason the interpolation could not be linear, polynomial or other preferred method of choice.

Generation of Departure Event Times from Arrival Event Times

The generation of departure event times from arrival event times, such as might be used to determine the length of time spent waiting after use of transaction apparatus in a fast food outlet, generates a set of departure event times, given a set of arrival event times and some observed heuristic value. The observed heuristic value may be an estimate of numbers of shopping units awaiting order fulfillment obtained from image or sensing data and may be in the form of numerical values determined at discrete time intervals or blocks. Other examples of observed heuristic values include numbers of cars in a parking lot, numbers of animals in an enclosure and numbers of other objects in a space being monitored. It is assumed that the departure event times are correct and that the observed heuristic value contains errors.

Figure 6:
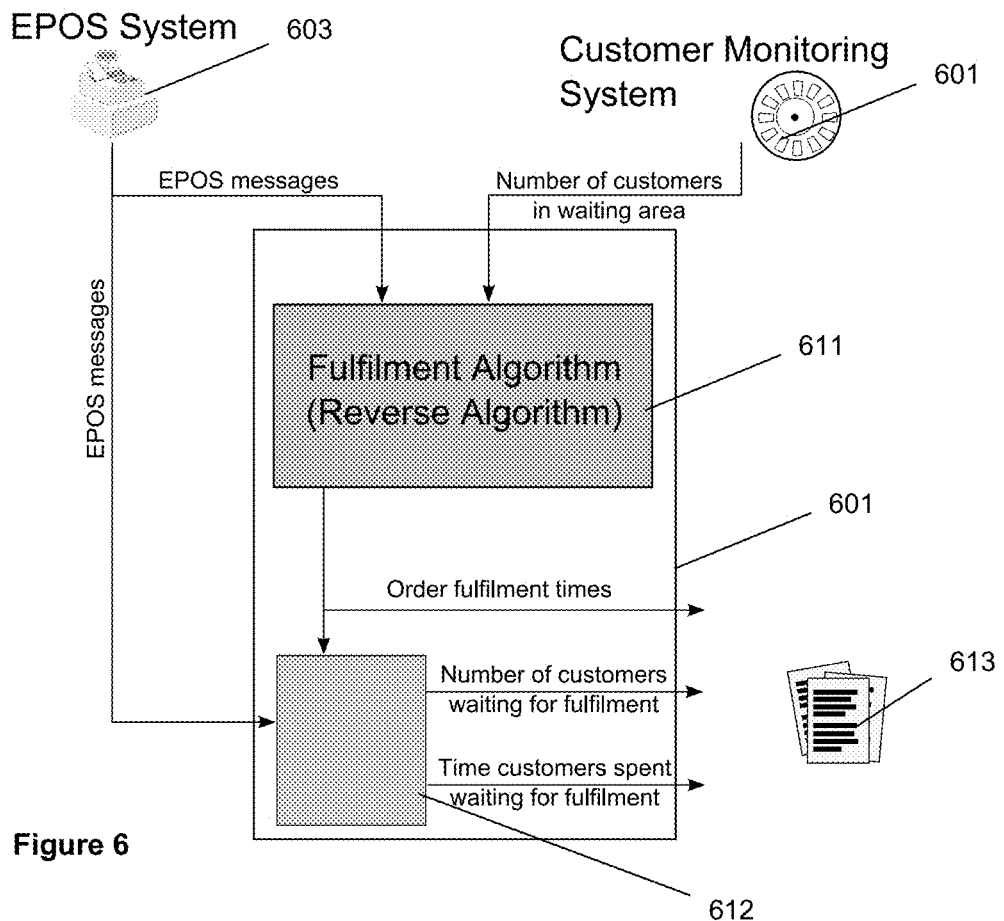
FIG. 6 shows in schematic form a specific set-up of apparatus for determining fulfillment time.

FIG. 6 shows in schematic form a specific set-up for determining fulfillment times. This comprises a sensor 601 or other device configured to provide heuristic information indicating numbers of people in a space being monitored who are waiting for order fulfillment. The setup of FIG. 6 further comprises an EPOS terminal 603 and computing system 610 configured to perform calculations to be described below. The operation on the EPOS and heuristic data can be considered to comprise two stages, namely determination of departure event times from EPOS end times using the heuristic data indicated by box 611 and converting the arrival and departure event times into other information such as queue lengths and customer waiting times indicated by box 612 which can be used for the compilation of store reports 613.

Again it is assumed that at each arrival or departure event there will be a step change of a constant amount in the actual value of which the observed heuristic value is an indication; however this change in observation may be attenuated or intensified by noise.

If the system is modified to deal with multiple arrivals and departures in the same time block, the step change may be a multiple of some constant amount.

The process of determining departure event times from arrival event times is sometimes referred to in the following as a "reverse" process since some of the logic of the queue monitoring process described above is performed in reverse in the process to be described below.

One example of the use of the reverse process is fulfillment duration calculation. An example of fulfillment duration is the time between paying for and receiving food in a fast food restaurant. A distinction is made between fulfillment duration, time spent waiting for food, and fulfillment time, instantaneous point in time when an order was fulfilled. The fulfillment time is taken to be equivalent to a departure event time indicating departure from the space being monitored. The EPOS end time is equivalent to an arrival event time indicating arrival of an object into the space being monitored and hence commencement of the fulfillment duration.

In a fulfillment process the input data is EPOS end times and (noisy) observations of the current numbers of shopping units waiting for their order to be fulfilled. The process then generates fulfillment times such that the number of waiting customers determined by the sequence of EPOS ends (fulfillment time starts) and fulfillments (fulfillment time ends) best match the observed values.

The process results in a set of most likely fulfillment times, which allows the plotting of numbers of customers waiting for fulfillment against time from which figures for total and average fulfillment duration may be obtained.

One way to achieve this is as follows:

Given a set of EPOS end times $\varepsilon \subseteq \{0, \ldots, T\}$ and a sequence of observations of the number of customers waiting for fulfillment $obs_0, \ldots, obs_T$ we want to find a set of fulfillment times $\mathcal{F} \subseteq \{0, \ldots, T\}$ such that $$\sum_{t=0}^{T} |obs_t - wff_t|$$

is minimized, where $$wff_t = wff_{t-1} + \begin{cases} 1, & \text{if } t \text{ in } E \\ 0, & \text{otherwise} \end{cases} - \begin{cases} 1, & \text{if } t \text{ in } F \\ 0, & \text{otherwise} \end{cases}$$

$$wff_0 = 0.$$

$wff_t$ is the number of customers waiting for fulfillment at time t determined using the estimated fulfillment time.

That is, the number of customers waiting for fulfillment at time t, $wff_t$, is the number waiting at time t−1 add any customers whose transactions finish in block t, minus any customers whose order was fulfilled in time block t.

Symmetrically to the calculation of arrival times from departure times, the process can be extended to multisets as required and $wff_0$ does not necessarily need to be set to zero.

One can clearly see the natural symmetry between the processes. The natural reverse of the process described above is the following. For correctness it is important to iterate over the EPOS ends in reverse chronological order—from last to first, hence the description of this process as the "reverse" process and the earlier process as the "forward" process.

Simple Fulfillment Search

---

Given a set of EPOS ends times $\varepsilon$ and observations $obs_0, \ldots, obs_T$.
findFulfillments($\varepsilon$, $obs_0, \ldots, obs_T$)
{
　Start with arrival set $\mathcal{F}$ empty.
　for(each EPOS end time e in $\varepsilon$)
　{
　　for(f = e, ..., T )
　　{
　　　Calculate error as $\Sigma_{t=e}^{T} |obs_t - wff_t|$, where the
　　　$wff_t$ have been generated using $\varepsilon$ and $\mathcal{F} \cup \{f\}$.
　　}
　　Add fulfillment time which gave least error
　　(greatest reduction in error) to $\mathcal{F}$.
　}
}

---

The simplest way to apply the process in this form is to play through time backwards, playing the events and observations in reverse, and apply the process described above. When considering events playing backwards, for example in the case of food order fulfillment, it is seen that there are unknown "start" event times, when the customer comes in and hands over food, and known "end" event times when the customer takes money and leaves.

One drawback of this approach is that it is necessary to wait until an appropriate end time, for example the end of the day, to run the process in reverse. However it is possible to extend the process such that it uses a rolling search window, providing results with a time lag equal to search window size.

The revised process constitutes running the end of day process on each search window block, and retaining only the fulfillment events known to be correct. The process to be described below is run each time an EPOS end event is about to drop out of the back end of the search window—hence only one fulfillment event is kept each time. Note that it is assumed that the size of the search window is larger than any expected fulfillment durations.

EPOS End Drop Out of Search Window Callback.

Given an EPOS end time e and error buffer values $err_e, \ldots, err_{e+w-1}$ giving the current error over the last w time blocks.

--- onEPOSendDropOut(e, $err_e, \ldots, err_{e+w-1}$)
{
Run find Fulfillments($\varepsilon$, $err_e, \ldots, err_{e+w-1}$), where $\varepsilon$ is the unmatched EPOS ends.
　Retain the earliest fulfillment time found and discard the rest.
　Keep error buffer up to date, by adding 1 to the appropriate blocks.
}

---

An example of this version of the "reverse" process will now be described with reference to FIGS. 7a to 7e. The process operates on an observed value, and some EPOS end events. Here the observed value is number of customers or shopping units waiting for fulfillment, or WFF. In practice, as with the forward process, it will be provided at intervals corresponding to a time block (or possibly more frequently) and can be represented graphically as shown in the Figures.

As in the illustrations of the forward algorithm, the curve represents observed values, the step function is given by a combination of EPOS end and fulfillment events, and the shaded grey regions are the calculated error.

Figure 7A:
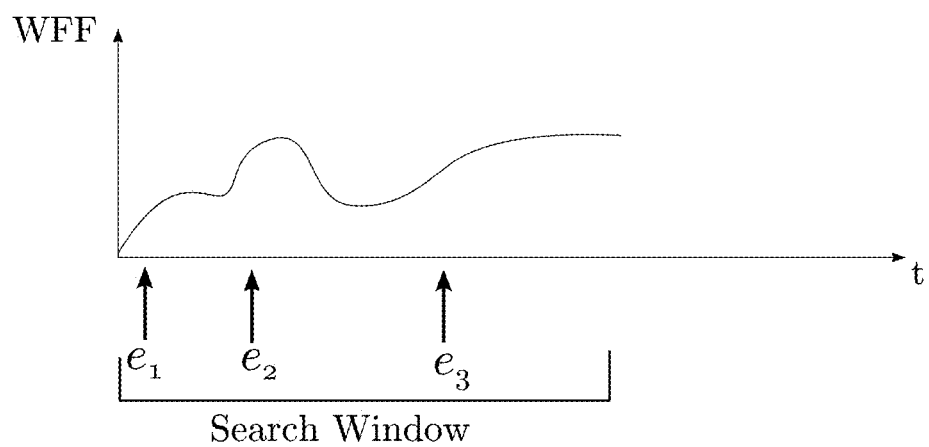
FIGS. 7a to 7e are graphs showing iterations in a process of determining departure event times from arrival event times.

In FIG. 7a, $e_1$ is about to drop out of the back of the search window, or buffer, so the sub-search for a fulfillment event is performed on the search window as described above under the heading "Simple Fulfillment Search".

The fulfillment times that the sub-search returns are $f_{1,3}$, $f_{1,2}$ and $f_{1,1}$—which match $e_3$, $e_2$ and $e_1$ respectively.

Figure 7B:
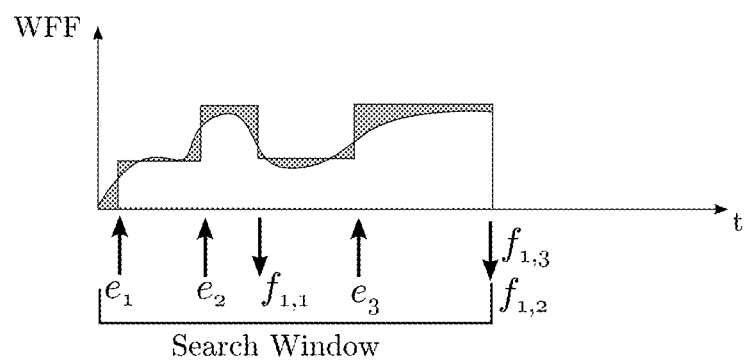

Recall a search is made for a fulfillment event for $e_3$ first, then $e_2$ and finally $e_1$. Therefore the result of findFulfillments( . . . ) operation on the search window is as shown in FIG. 7b. At this point $f_2$ and $f_3$ are unknown but should be taken into account in certain embodiments. Therefore $f_{1,2}$ and $f_{1,3}$ are placed at the end of the search window, since this gives the lowest error.

Figure 7C:
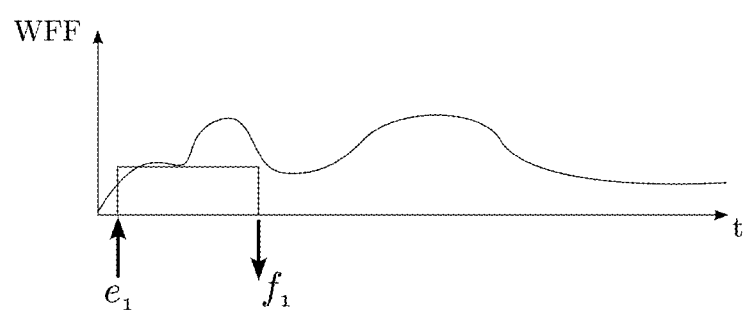

Only the earliest fulfillment time is retained as obtained from the sub-search above, $f_{1,1}$, as $f_1$. This is described in the process above "EPOS End Drop Out Of Search Window Callback". The result is shown in FIG. 7c.

Figure 7D:
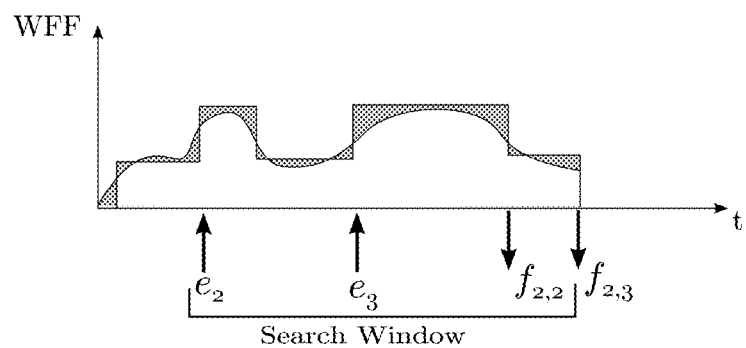

At a later point in time, when $e_2$ is now about to drop out of the end of the search window, the sub-search s performed again. A fulfillment event is found for each of the EPOS ends in the buffer. Hence $f_{2,3}$ and $f_{2,2}$ are found. The result is shown in FIG. 7d.

Figure 7E:
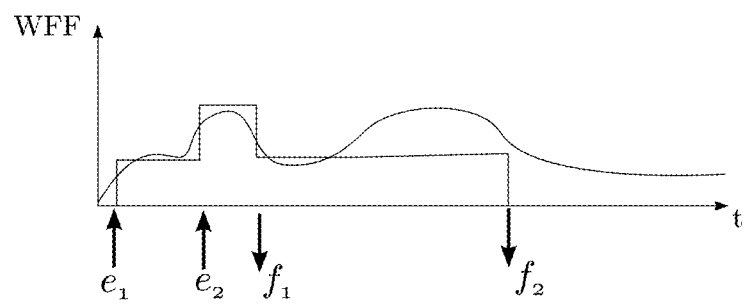

The process retains $f_{2,2}$ as $f_2$ since it is the earliest fulfillment. The results, thus far, now contain two fulfillment times as shown in FIG. 7e.

As time passes and more observations are received and the search window is moved along, the search for $e_3$ and any future EPOS end events would be performed.

The final outputs would be the fulfillment event times, fulfillment durations and a graph of customers waiting for fulfillment over time that is more accurate than the input observation.

It is assumed in the foregoing that customers' orders are fulfilled in the same order as their transactions are processed. Note that this is not strictly true, however it holds true for the majority of transactions and, whilst the assumption may introduce error into a customer's individual fulfillment duration, the total fulfillment duration across all customers will remain unchanged. Hence the error introduced will be negligible with sufficient averaging.

Hence given a set of ordered EPOS end events and fulfillment events it is possible to match them up to obtain fulfillment durations for each customer as follows.

Enumerate the elements in $\varepsilon$ and $\mathcal{F}$ as $e_1, \ldots, e_n$ and $f_1, \ldots, f_n$ respectively. Recall that there the same number of elements in $\varepsilon$ and $\mathcal{F}$ by nature of the algorithm. Customer fulfillment durations $c_1, \ldots, c_n$ are obtained as $$c_i = f_i - e_i.$$

Given the fulfillment duration and the instant in time when the customer's transaction occurred various statistics (averages, standard deviation, etc) can be calculated for the day or any part thereof. For example, calculate the average fulfillment duration for customers whose transactions occurred between 4 pm and 5 pm.

The number of customers waiting for fulfillment for any particular time can be obtained by tallying up the EPOS end and fulfillment events up to that time as in the calculation of $wff_i$ above.

Figure 8:
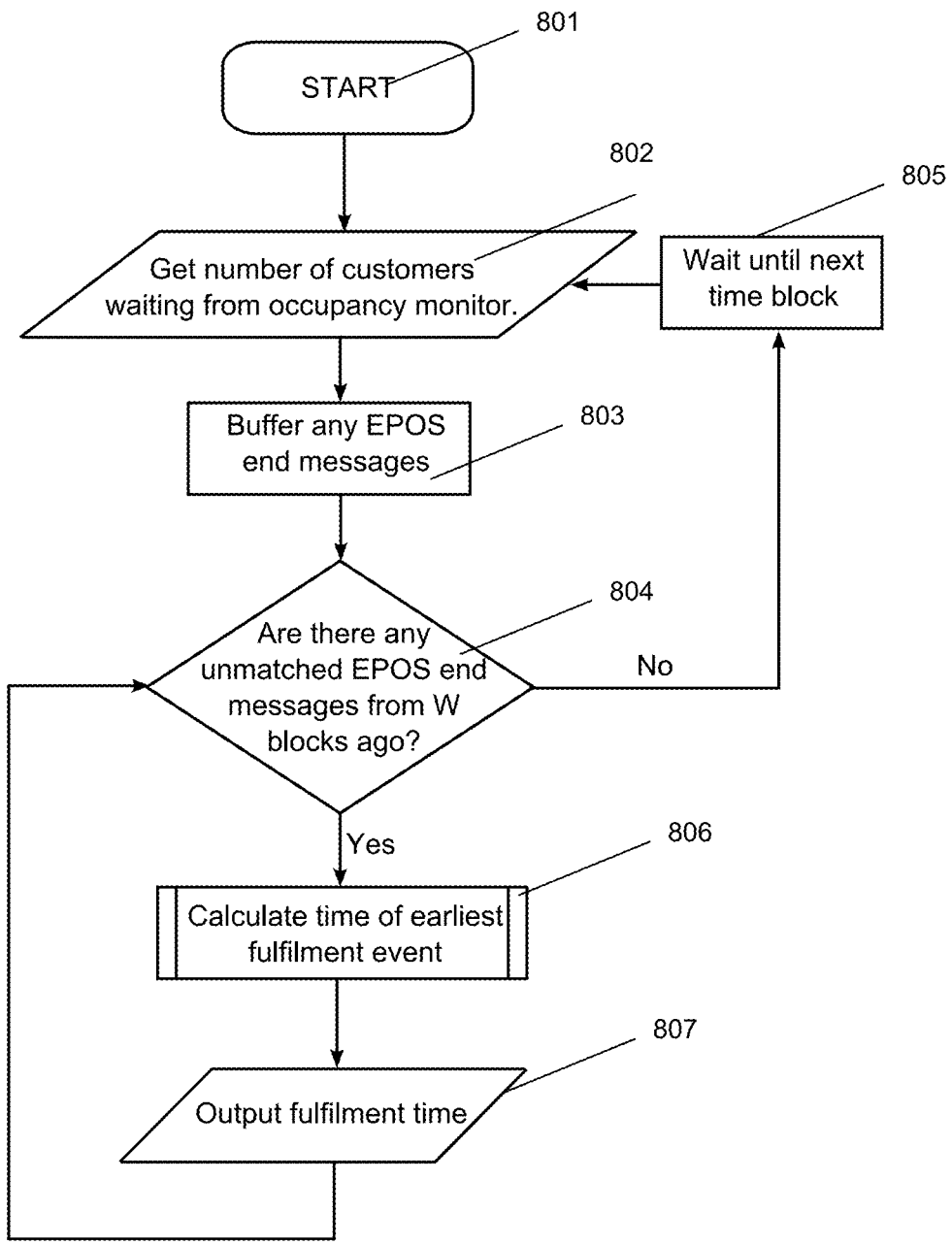
FIG. 8 is a flow chart showing steps in a process of determining departure event times from arrival event times.

FIG. 8 is a flow chart providing an overview of a process for determining departure event times (or fulfillment times). The process begins with initialisation at step 801. Then at step 802, numbers of customers waiting are obtained, for example from an occupancy monitor such as device 101 of FIG. 1.

Any received EPOS end messages are buffered at step 803. At step 804 a decision is made as to whether there any unmatched EPOS end messages from a time period ago corresponding to the length of the window, where the length of the window is equal to W blocks of time. If there are none the process waits for another time block at step 805 and steps 802 and 803 and 804 are then repeated.

If the result of the decision at step 804 is yes, the time of the earliest fulfillment event in the window is calculated at step 806 and the result is outputted at step 807. Step 804 is repeated for each unmatched EPOS end event detected at step 804 until there are no more, in which case steps 805, 802 and 803 and 804 are repeated.

Figure 9:
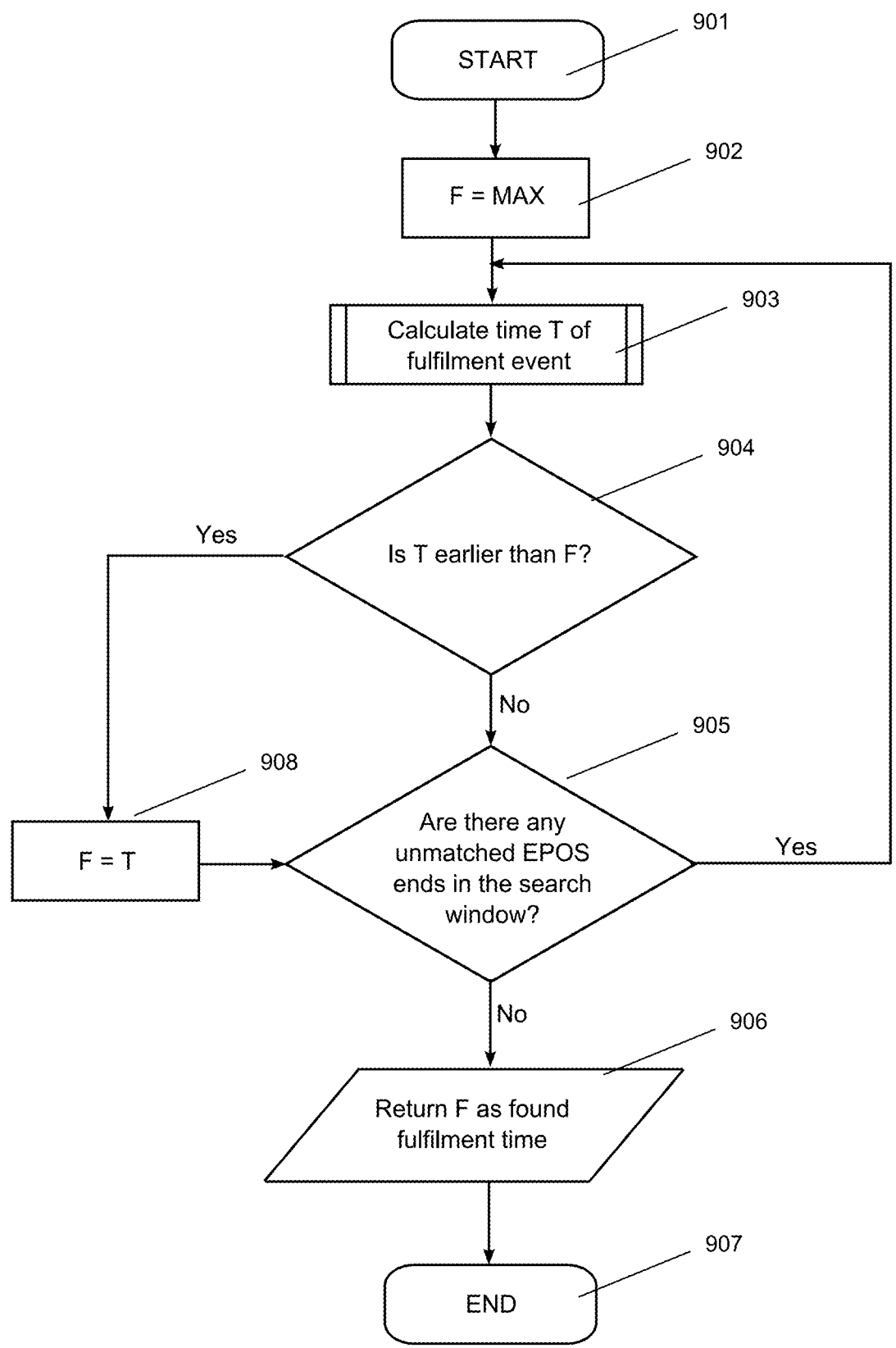
FIG. 9 is a flow chart showing steps in a subroutine of the process of FIG. 8.

FIG. 9 shows a suitable subroutine for calculating the earliest fulfillment time corresponding to step 806 of FIG. 8. This is equivalent to the "EPOS End Drop Out of Search Window Callback" process described above.

The process is initialised at step 901. At step 902 a value F, representing a possible fulfillment time, is set to a maximum value which will be at the end of the search window. At step 903 the time T of a fulfillment event corresponding to an unmatched EPOS end event is calculated according to a subroutine to be described below. At this point the latest of the EPOS end events is chosen for the calculation. If the result of this calculation results in a value of T no earlier than F, according to a decision at step 904, a check is made at step 905 as to whether there are any unmatched EPOS ends in the search window. If not, F is returned as the found fulfillment time at step 906 and the process ends at step 907.

Alternatively if T is found to be earlier than F at step 904, F is made equal to T at step 908 and then if there are no unmatched EPOS end results, F (which has now been changed to T) is returned as the fulfillment time at step 906.

If there are unmatched EPOS ends in the search window found at step 905, steps 903, 904, 908 and 905 are repeated. This is because as noted above, the calculation of the fulfillment time for the earliest EPOS end in the window uses an estimate of fulfillment times for later EPOS events. Thus in each repetition of steps 903, 904, 908 and 905, the next previous EPOS end event is chosen until there are no more unmatched events at step 905.

Figure 10:
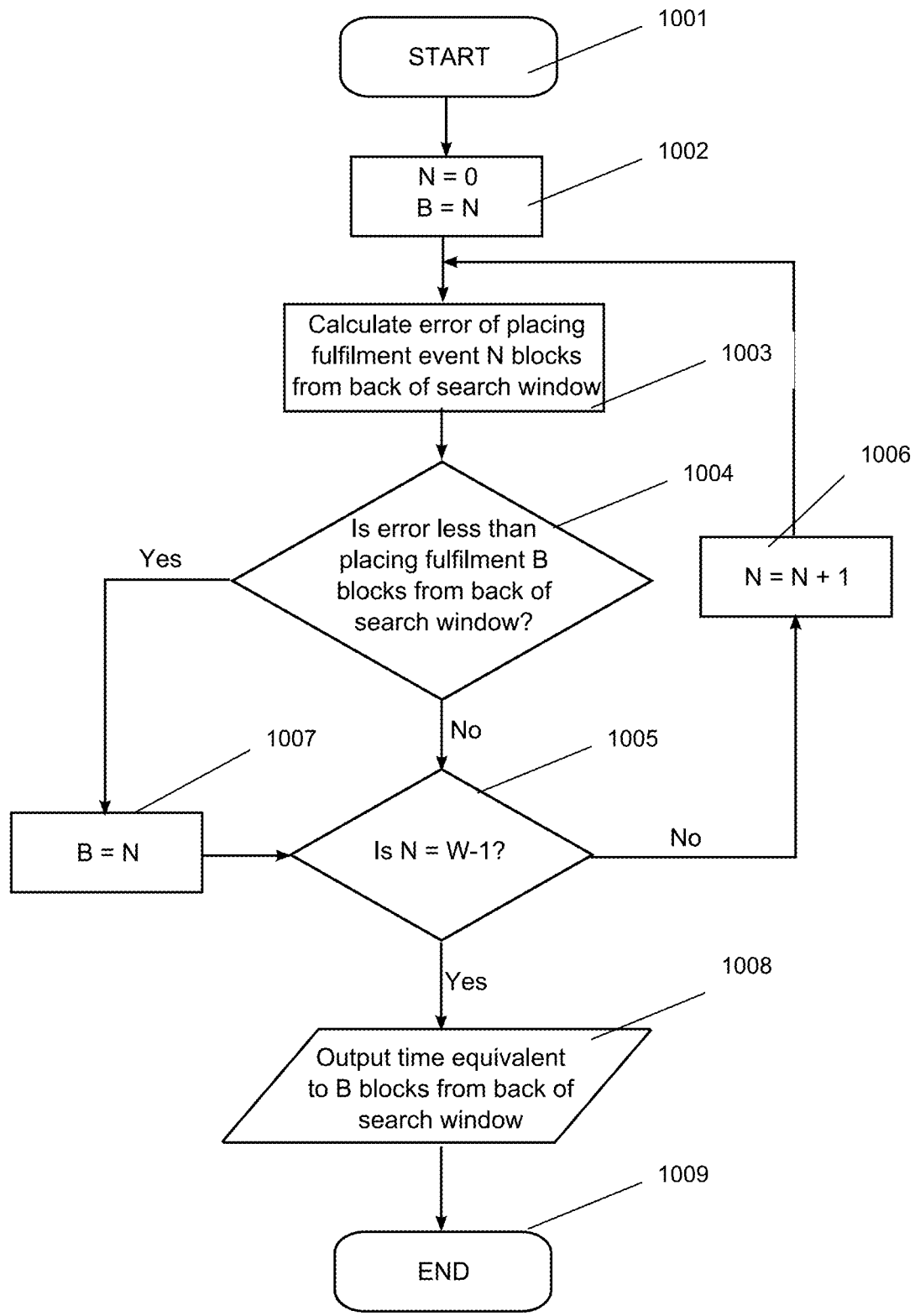
FIG. 10 is a flow chart showing steps in a subroutine of the process of FIG. 9.

The subroutine of FIG. 10 is similar to the subroutine of FIG. 5. In FIG. 5 the departure event time was at the end of the window and a search was made for an earlier arrival event time. In FIG. 10, the arrival event time or EPOS end time is at the start of the window and a search is made for a later departure event time.

The process of FIG. 10 begins with initialisation at step 1001 following which value N is set to 0 and value B is set equal to N at step 1002. At step 1003 the unprocessed EPOS end message is used together with the queue length data obtained in step 802 (FIG. 8) to perform an error calculation based on placing the departure event time (fulfillment time) equivalent to the unprocessed EPOS end message N blocks after the earliest time, or back, of the search window.

At step 1004 a decision is made as to whether the error calculated in step 1003 is less than the error resulting from placing the fulfillment time B blocks forward in time from the earliest time in the search window. At the first iteration, since B=N, the answer will be no and the process continues to step 1005 where N is compared to W−1, W being the number of time blocks in the window.

If the result of decision 1005 is no, the process continues to step 1006 where N is incremented by one.

Step 1004 is repeated at which point a reduction in calculated error might occur in which case B is made equal to N at step 1007.

The process continues until N=W−1 at step 1005 at which point a time equivalent to B blocks ahead of the earliest time in the window is output as the fulfillment time corresponding to the EPOS end time.

The process of FIG. 10 ends at step 1009.

In the foregoing processes have been described for the specific purpose of matching arrival event times to departure event times and vice versa in the particular context of occupancy of a space. The processes can be implemented in other ways to match events, one of which leads to an increase in an observed value and one of which leads to a corresponding decrease of the same amount. In other words processes have more general application to any event matching scenario where events cause any (positive or negative) floating point deviation in an observed value. It should be noted that to retain algorithm correctness the expected change in the observed value caused by events is constant (or a multiple of a constant) in certain embodiments.

In the extension of the foregoing processes to deal with multiple arrivals or departures in the same time interval, is possible to have one event time for multiple objects or respective identical event times, one for each object. This latter was chosen since it is the simplest to implement; however either method would be fine since they are mathematically identical. Similar to how a multi-set can be described as a set permitting multiple occurrences of an element or, equivalently, a set of unique elements plus a function mapping each element to its multiplicity. It is possible to have a time for each object, or a set of times and function mapping times to (possibly multiple) objects.

It is assumed in the foregoing that there are the same number of incrementing events and decrementing events. However it is possible for a number of these to be located at the start or end of the entire time interval the algorithm is running on. This, essentially, represents the situation where we start or end with the space occupied.

The processes are not limited to the value being shopping units, people or even integers.

The result of the process is the matching of events, improved approximation of the measured quantity, the sum of times between matched events and any combination of the foregoing.

The processes described above may be implemented as algorithms running on computing apparatus. Thus there are provided in the foregoing algorithms for retrospective correction or generation of events or observations given a set of future events and observations.

The algorithms produce a most likely set of events, an accurate approximation of the value being observed. This accurate approximation allows accurate measurement of the time duration between corresponding events. The capability to accurately measure this duration is particularly useful for occupancy based measuring (queues, loitering customers, fulfillment, etc).

Event matching and retrospective correction can be performed with the reverse algorithm described above.

All of the above may be performed in real-time with a time lag.

A particular advantage of the processes described above is that no training of a computer algorithm, and hence no initial data is required. Therefore a system implementing the processes can be up and running immediately on installation. Clearly the processes described in the foregoing leads to more accurate determination of information relating to occupancy of a space than is possible with known queue counting systems that use only data from a camera or sensor monitoring a scene for determination of occupancy.

It should be noted that in the case of determining arrival event times from departure event times, no arrival detection input is required. Conversely in the case of determining departure event times from arrival event times, no departure detection input is required. Furthermore, by nature of the processes, the number of arrival events generated will be equal to the number of EPOS end events, that is, no extra false-arrivals or departures are generated.

In fulfillment time generation it is possible to identify customers waiting for fulfillment using an occupancy monitoring system. Occupancy monitoring is people tracking within a defined space, a well explored topic. Given a system which can identify waiting customers, it is possible to observe when this number is reduced and attribute this to fulfillment events. In practice an estimate generated this way suffers from substantial noise; however with the process described above it is possible to extract an accurate approximation of fulfillment times from this noisy observation.

A system of the kind described above performs correction in real-time with a time lag equal to search window duration, which allows reporting throughout the day to the customer.

The system can cater for queues of arbitrary length.

The system can be used on queue lines with more than one EPOS terminal.

Since the systems ties arrival or fulfillment information to an EPOS transaction, the system could be used in conjunction with loyalty card information to generate queuing/fulfillment statistics for each individual identifiable customer.

The system takes a heuristic queue length input from any queuing system and produces the most likely consistent history of queue length. Consistent in the sense that the number of arrivals equals the number of EPOS transactions and the queue length never drops below zero.

The system produces fulfillment duration information without the need for traditional barcode-ticket system or cashiers pushing buttons on the EPOS system.

The system is relatively computationally inexpensive; it can be run on low performance, low cost hardware.

The method and system might also be extended to the determination of the number of objects in a container, which might be useful in a production line.

The observed heuristic value of the occupancy of the space need not be derived from image or other viewing or sensing information. For example, it could be based on weight, temperature, humidity or any other parameter suitable for the object or the space.

For example, if a constant weight for each subject/object is assumed, one could measure occupancy via a weighted platform. E.g. the reverse algorithm could be applied in a supermarket, where a weighted shelf, combined with staff signaling when they restock the shelves, could be used to give a set of times for when items were taken by customers—even given noise from customers picking up items to read the label and returning them to the shelf, leaning on the shelf or generally creating any temporary deviation in the accuracy of the weighing system.

Various examples have been described. These and other examples are within the scope of the following claims.

The invention claimed is:

1. A computer-implemented method of determining information relating to the occupancy of a space, the method comprising:
   receiving first data from a sensor relating to an estimation of the occupancy of the space over a time period;
   receiving second data from a point of sale apparatus, the second data comprising either i) a set of decrementing event times occurring during the time period, or ii) a set of incrementing event times occurring during the time period, wherein decrementing events and incrementing events are events affecting the occupancy of the space during the time period;
   either:
      using the first data and the set of decrementing event times to determine estimated incrementing event times occurring during the period of time, each estimated incrementing event time determined to correspond to a respective decrementing event time in the set of decrementing event times, or
      using the first data and the set of incrementing event times to determine estimated decrementing event times occurring during the period of time, each estimated decrementing event time determined to correspond to a respective incrementing event time in the set of incrementing event times;
   revising the estimation of the occupancy of the space over the period of time using either: a) the determined corresponding decrementing event times and estimated incrementing event times or b) the determined corresponding incrementing event times and estimated decrementing event times; and
   compiling at a computing apparatus a report using the revised estimation of the occupancy.

2. The method of claim 1 in which the first data comprises estimated numbers of objects or object groups in the space and the method comprises using the determined corresponding decrementing event times and estimated incrementing event times to determine a duration of occupancy of the space by an object or object group.

3. The method of claim 1 in which the first data comprises estimated numbers of objects or object groups in the space which include non-integer values for the number of objects or object groups in the space.

4. The method of claim 1, wherein determining estimated incrementing event times comprises determining correspondence between an estimated incrementing event time and a respective decrementing event time in the set of decrementing event times for which an error value is minimized, where $O_t$ is the number of objects or groups of objects in the space at time t estimated from the first data and $Q_t$ is the number of objects or object groups in the space at time t determined using a decrementing event time in the set of decrementing event times and a possible estimated incrementing event time.

5. The method of claim 4 in which estimating the incrementing event time is based on a step change of a predetermined amount.

6. The method of claim 5 in which the predetermined amount is an integer.

7. The method of claim 6 in which the predetermined amount is one.

8. The method of claim 4, in which finding an estimated incrementing event time is carried out only for values of t in a time window within the time period.

9. The method of claim 4, in which the second data comprises the set of decrementing event times occurring during the time period and the step of using the first data and the set of decrementing event times to determine the estimated incrementing event time corresponding to the decrementing event time comprises performing a search for incrementing event times over a time window preceding the decrementing event time.

10. The method of claim 9, in which the second data comprises data indicative of times of decrementing events of objects or object groups from the space during the time period.

11. The method of claim 10, wherein determining information relating to the occupancy of a space comprises determining the length of a queue to use a facility, and wherein determining incrementing event times corresponds to determining an increase in queue length.

12. The method of claim 11 in which each decrementing event time is taken to indicate a decrease in the queue length.

13. The method of claim 4, in which the second data comprises the set of incrementing event times occurring during the time period and the step of using the first data and the set of incrementing event times to determine the estimated decrementing event time corresponding to the incrementing event time comprises performing a search for possible decrementing event times over at least a time window following the incrementing event time.

14. The method of claim 13 in which performing the search for possible decrementing event times corresponding to a particular incrementing event time comprises:
 a. estimating a decrementing event time for each incrementing event time in the time window following the particular incrementing event time; and
 b. using any estimated decrementing event times in step a) to determine a possible decrementing event time corresponding to the particular incrementing event time.

15. The method of claim 14 in which in step a) a decrementing event time is estimated for each incrementing event time in the time window taking the incrementing event times in reverse chronological order.

16. The method of claim 1, in which receiving the second data comprises receiving data indicative of times of decrementing events of objects or object groups from the space during the time period.

17. The method of claim 16, wherein determining information relating to the occupancy of a space comprises determining fulfillment duration, and wherein determining decrementing event times corresponds to determining fulfillment and taking each decrementing event time as the end of a fulfillment time.

18. The method of claim 17 in which each incrementing event time is taken to be the start of a fulfillment duration.

19. A non-transitory computer readable medium comprising instructions which when implemented in one or more processors of computing apparatus cause the apparatus to perform the method comprising:
 receiving first data from a sensor relating to an estimation of the occupancy of the space over a time period;
 receiving second data from a point of sale apparatus, the second data comprising either i) a set of decrementing event times occurring during the time period, or ii) a set of incrementing event times occurring during the time period, wherein decrementing events and incrementing events are events affecting the occupancy of the space during the time period;
 either:
  using the first data and the set of decrementing event times to determine estimated incrementing event times occurring during the period of time, each estimated incrementing event time determined to correspond to a respective decrementing event time in the set of decrementing event times, or
  using the first data and the set of incrementing event times to determine estimated decrementing event times occurring during the period of time, each estimated decrementing event time determined to correspond to a respective incrementing event time in the set of incrementing event times;
 revising the estimation of the occupancy of the space over the period of time using either: a) the determined corresponding decrementing event times and estimated incrementing event times or b) the determined corresponding incrementing event times and estimated decrementing event times; and
 compiling a report using the revised estimation of the occupancy.

20. A computing apparatus comprising one or more processors configured to implement the method comprising:
 receiving first data from a sensor relating to an estimation of the occupancy of the space over a time period;
 receiving second data from a point of sale apparatus, the second data comprising either i) a set of decrementing event times occurring during the time period, or ii) a set of incrementing event times occurring during the time period, wherein decrementing events and incrementing events are events affecting the occupancy of the space during the time period;
 either:
  using the first data and the set of decrementing event times to determine estimated incrementing event times occurring during the period of time, each estimated incrementing event time determined to correspond to a respective decrementing event time in the set of decrementing event times, or
  using the first data and the set of incrementing event times to determine estimated decrementing event times occurring during the period of time, each estimated decrementing event time determined to correspond to a respective incrementing event time in the set of incrementing event times;
 revising the estimation of the occupancy of the space over the period of time using either: a) the determined corresponding decrementing event times and estimated incrementing event times or b) the determined corresponding incrementing event times and estimated decrementing event times; and
 compiling a report using the revised estimation of the occupancy.

21. A system for determining information relating to occupancy of a space comprising:
 one or more sensors and associated signal processing circuitry configured to process signals from the one or more sensors to output data comprising an estimation of numbers of objects or object groups in the space over a time period; and
 a computing apparatus comprising one or more processors configured to implement a method comprising:
 receiving first data from the one or more sensors relating to the estimation of occupancy of the space over the time period;
 receiving second data from a point of sale apparatus, the second data comprising either i) a set of decrementing event times occurring during the time period, or ii) a set of incrementing event times occurring during the time period, wherein decrementing events and incrementing events are events affecting the occupancy of the space during the time period;

either:

using the first data and the set of decrementing event times to determine estimated incrementing event times occurring during the period of time, each estimated incrementing event time determined to correspond to a respective decrementing event time in the set of decrementing event times, or using the first data and the set of incrementing event times to determine estimated decrementing event times occurring during the period of time, each estimated decrementing event time determined to correspond to a respective incrementing event time in the set of incrementing event times;

revising the estimation of the occupancy of the space over the period of time using either: a) the determined corresponding decrementing event times and estimated incrementing event times or b) the determined corresponding incrementing event times and estimated decrementing event times; and using the revised estimation of the occupancy to compile a report.

\* \* \* \* \*